(12) United States Patent
Inoue

(10) Patent No.: US 11,660,539 B2
(45) Date of Patent: May 30, 2023

(54) STORAGE MEDIUM STORING INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventor: Seita Inoue, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 17/645,822

(22) Filed: Dec. 23, 2021

(65) Prior Publication Data

US 2022/0249954 A1 Aug. 11, 2022

(30) Foreign Application Priority Data

Feb. 10, 2021 (JP) .............................. JP2021-019907

(51) Int. Cl.
*A63F 13/63* (2014.01)
*A63F 13/497* (2014.01)
*A63F 13/533* (2014.01)

(52) U.S. Cl.
CPC ............ *A63F 13/63* (2014.09); *A63F 13/497* (2014.09); *A63F 13/533* (2014.09); *A63F 2300/308* (2013.01); *A63F 2300/6018* (2013.01)

(58) Field of Classification Search
None
See application file for complete search history.

(56) References Cited

U.S. PATENT DOCUMENTS

| | | | |
|---|---|---|---|
| 11,513,658 B1* | 11/2022 | Olsen | G06F 16/285 |
| 2006/0217008 A1 | 9/2006 | Higashino et al. | |
| 2016/0214012 A1* | 7/2016 | Nishikawa | A63F 13/497 |
| 2019/0205078 A1* | 7/2019 | Sueki | G06T 19/006 |
| 2019/0282904 A1* | 9/2019 | Hedjazi | A63F 13/67 |

FOREIGN PATENT DOCUMENTS

JP 2006-268406 10/2006

* cited by examiner

*Primary Examiner* — Reginald A Renwick
(74) *Attorney, Agent, or Firm* — Nixon & Vanderhye PC

(57) ABSTRACT

A character is displayed in its initial state in a virtual space with at least two of a plurality of parts set as non-exposed parts that are at least partially covered by respective corresponding accessories. A playback process of playing back a scene that an accessory for one of the at least two non-exposed parts is moved such that the one of the at least two non-exposed parts is exposed, and a changing process of allowing a user to change the part exposed by the playback process, are executed serially for the at least two non-exposed parts of the character in the initial state.

20 Claims, 10 Drawing Sheets

US 11,660,539 B2

STORAGE MEDIUM STORING INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATIONS

This application claims priority to Japanese Patent Application No. 2021-19907, filed on Feb. 10, 2021, the entire contents of which are incorporated herein by reference.

FIELD

The technology disclosed herein relates to a storage medium storing an information processing program that performs a process using a character in a virtual space, an information processing apparatus, an information processing system, and an information processing method.

BACKGROUND AND SUMMARY

In some conventional programs, a character that appears in a virtual space is customizable.

However, in the case where the user is allowed to choose each part to customize the character, such programs are required to appropriately guide the user.

Therefore, it is an object of the present non-limiting example to provide a storage medium storing an information processing program that allows the user to easily understand which part is to be next changed in customizing a character, an information processing apparatus, an information processing system, and an information processing method.

To achieve the object, this non-limiting example has the following features, for example.

In a non-limiting example configuration of a non-transitory computer-readable storage medium having stored therein an information processing program of this non-limiting example, a non-transitory computer-readable storage medium having stored therein an information processing program for causing a computer to execute a character customizing process of allowing a user to change a plurality of parts included in a character appearing in a virtual space, the information processing program causing the computer to perform operations comprising: displaying the character in the virtual space in an initial state with at least two of the plurality of parts set as non-exposed parts that are at least partially covered by respective accessories; and executing a playback process of playing back a scene that the accessory for one of the at least two non-exposed parts is moved such that the one of the at least two non-exposed parts is exposed, and a changing process of allowing the user to change the part exposed by the playback process, serially for the at least two non-exposed parts of the character in the initial state.

Thus, in customizing a plurality of parts included in a character, a scene is provided in which a part to be changed by the user is exposed externally and displayed, and therefore, the user can easily understand which of the parts is to be next changed.

Further, the information processing program may cause the computer to perform operations comprising: after having performed the playback process and the changing process on a first one of the at least two non-exposed parts, executing a customizing process of allowing the user to change a second one of the at least two non-exposed parts that is different from the first non-exposed part, with the first non-exposed part exposed.

Thus, another part can be chosen or created, taking into consideration a balance between that part and a part(s) that has already been changed or the entire character.

Further, in executing the customizing process of allowing the user to change the second non-exposed part, the first non-exposed part may be displayed together with the second non-exposed part in the character in a display screen with the first non-exposed part exposed, and a recustomizing process of allowing the user to change the displayed first non-exposed part again may be enabled.

Thus, in considering how to change a changeable part, if a balance between that part and a part that has already been changed is not satisfactory, the part that has already been changed can be modified.

Further, this non-limiting example may be carried out in the form of an information processing apparatus, information processing system, and information processing method.

According to the present non-limiting example, the user can easily understand which of the plurality of parts included in the character is to be next changed.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

A game system according to the present non-limiting example will now be described. A non-limiting example of a game system 1 according to the present non-limiting example includes a main body apparatus (information processing apparatus serving as the main body of a game apparatus in the present non-limiting example) 2, a left controller 3, and a right controller 4, and also serves as an information processing system. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other. In the description that follows, a hardware configuration of the game system 1 of the present non-limiting example is described, and thereafter, the control of the game system 1 of the present non-limiting example is described.

Figure 1:
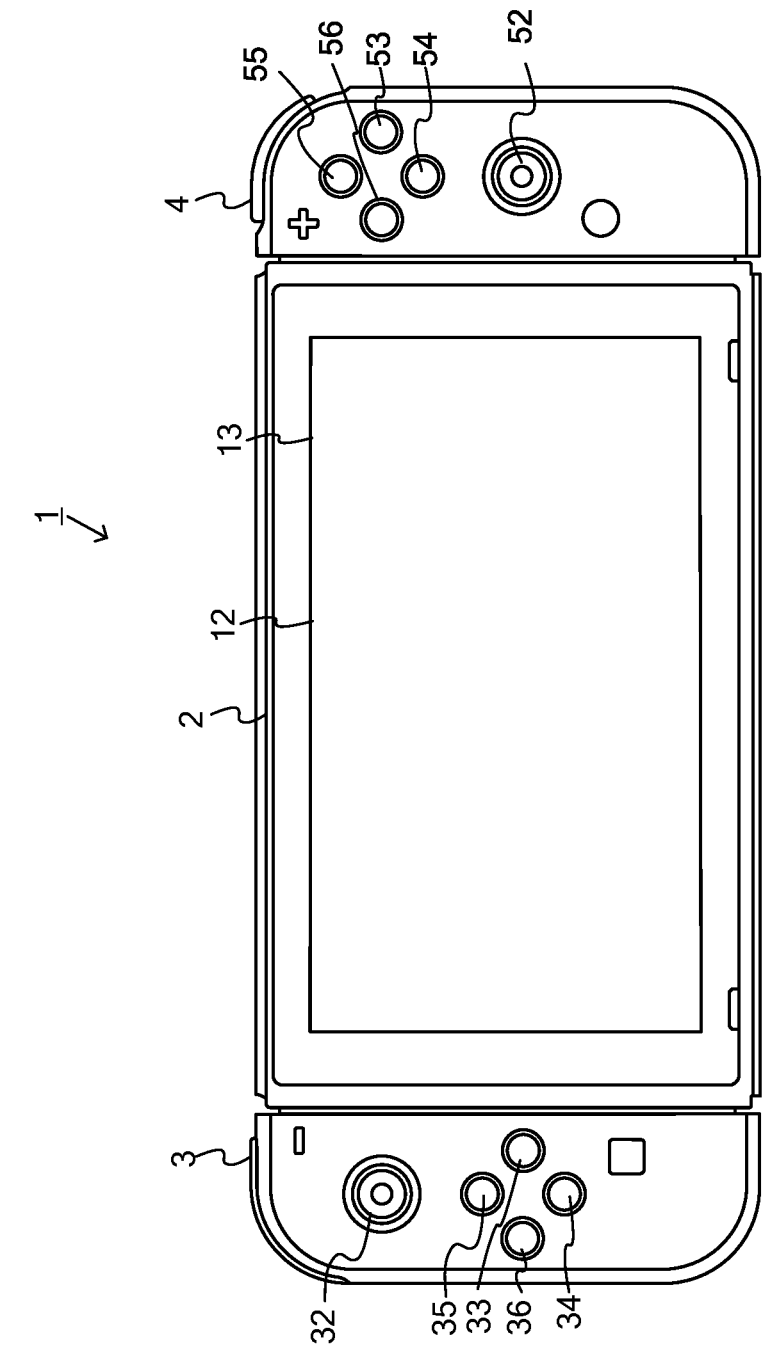
FIG. 1 is a diagram illustrating a non-limiting example of a state in which a left controller 3 and a right controller 4 are attached to a main body apparatus 2.

FIG. 1 is a diagram illustrating a non-limiting example of a state in which the left controller 3 and the right controller 4 are attached to the main body apparatus 2. As illustrated in FIG. 1, each of the left controller 3 and the right controller 4 is attached to and unified with the main body apparatus 2. The main body apparatus 2 is for performing various processes (e.g., a game process) in the game system 1. The main body apparatus 2 includes a display 12. Each of the left controller 3 and the right controller 4 is an apparatus including operation sections with which a user provides inputs.

The main body apparatus 2 includes a display 12. The display 12 displays an image generated by the main body apparatus 2. In the present non-limiting example, the display 12 is a liquid crystal display device (LCD). The display 12, however, may be a display device of any suitable type.

In addition, the main body apparatus 2 includes a touch panel 13 on the screen of the display 12. In the present non-limiting example, the touch panel 13 allows multi-touch input (e.g., a capacitive touch panel). It should be noted that the touch panel 13 may be of any suitable type, e.g., it allows single-touch input (e.g., a resistive touch panel).

Figure 2:
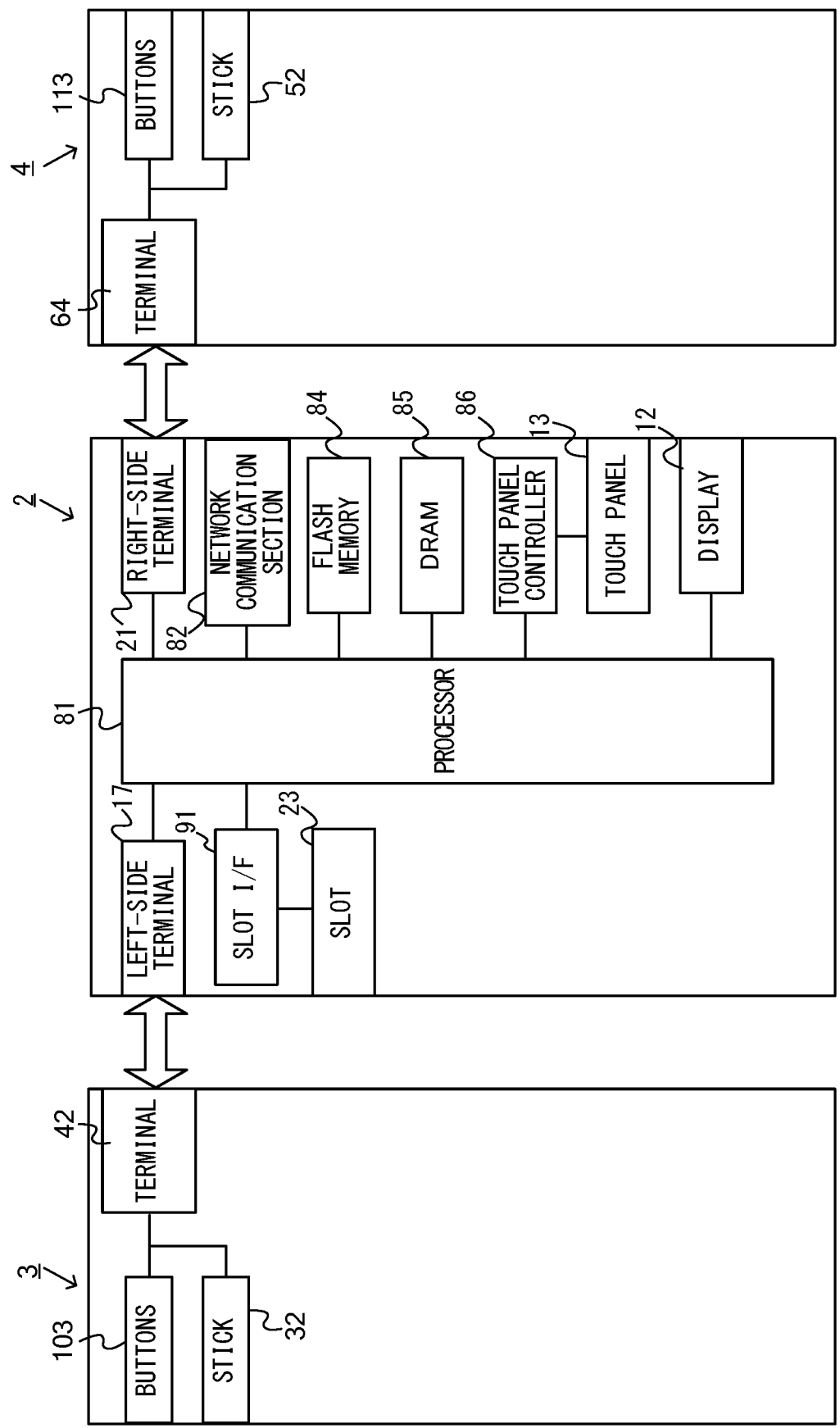
FIG. 2 is a block diagram illustrating non-limiting examples of internal configurations of the main body apparatus 2, the left controller 3, and the right controller 4.

The main body apparatus 2 includes a slot 23 that is so shaped as to allow a predetermined type of storage medium to be attached to the slot 23 (see FIG. 2). The predetermined type of storage medium is, for example, a dedicated storage medium (e.g., a dedicated memory card) for the game system 1 and an information processing apparatus of the same type as that of the game system 1. The predetermined type of storage medium is used to store, for example, data (e.g., saved data of an application or the like) that is used by the main body apparatus 2 and/or a program (e.g., a program for an application or the like) that is executed by the main body apparatus 2.

The left controller 3 includes an analog stick 32 and four operation buttons 33 to 36 as a non-limiting example of an operation button. The right controller 4 includes an analog stick 52 and four operation buttons 53 to 56 as a non-limiting example of an operation button. These operation buttons are used to give instructions according to various programs (e.g., an OS program and an application program) that are executed by the main body apparatus 2.

FIG. 2 is a block diagram illustrating non-limiting examples of the internal configurations of the main body apparatus 2, the left controller 3, and the right controller 4. The main body apparatus 2 includes a processor 81. The processor 81 is an information processor for executing various types of information processing that are executed in the main body apparatus 2. For example, the processor 81 may include only a central processing unit (CPU), or may include a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as non-limiting examples of internal storage media built in itself. The flash memory 84 and the DRAM 85 are connected to the CPU 81. The flash memory 84 is mainly used to store various types of data (or a program) that are stored in the main body apparatus 2. The DRAM 85 is used to temporarily store various types of data that are used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In the present non-limiting example, as a first communication form, the network communication section 82 connects to a wireless LAN and communicates with an external apparatus, using a method compliant with the Wi-Fi standard. Furthermore, as a second communication form, the network communication section 82 wirelessly communicates with another main body apparatus 2 of the same type, using a predetermined communication method (e.g., communication based on a particular protocol or infrared light communication).

The processor 81 is connected to a left-side terminal 17 and a right-side terminal 21. The processor 81 transmits data to the left controller 3 via the left-side terminal 17 and also receives operation data from the left controller 3 via the left-side terminal 17. Furthermore, the processor 81 transmits data to the right controller 4 via the right-side terminal 21 and also receives operation data from the right controller 4 via the right-side terminal 21.

The main body apparatus 2 includes a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input has been performed. Then, the touch panel controller 86 outputs the data to the processor 81.

Furthermore, the display 12 is connected to the processor 81. The processor 81 displays, on the display 12, a generated image (e.g., an image generated by executing the above information processing) and/or an externally obtained image.

The left controller 3 includes buttons 103 (specifically, the buttons 33 to 36, etc.). The left controller 3 also includes the analog stick ("stick" in FIG. 2) 32. Each of the buttons 103 and the analog stick 32 outputs information about an operation performed on itself to the main body apparatus 2 via the terminal 42 repeatedly with appropriate timing.

The right controller 4 includes input sections similar to the input sections of the left controller 3. Specifically, the right controller 4 includes buttons 113 and the analog stick 52. These input sections have functions similar to those of the input sections of the left controller 3 and operate in manners similar to those of the input sections of the left controller 3.

Thus, a game is played in a virtual space displayed on the display 12, according to operations performed on the operation buttons and sticks of the left controller 3 and/or the right controller 4 in the game system 1 when the unified apparatus is formed, or touch operations performed on the touch panel 13 of the main body apparatus 2, or the like. In the present non-limiting example, as a non-limiting example, a game can be played using a player character in the virtual space, according to the user's operation using the operation buttons and sticks, and the touch panel 13.

Figure 3:
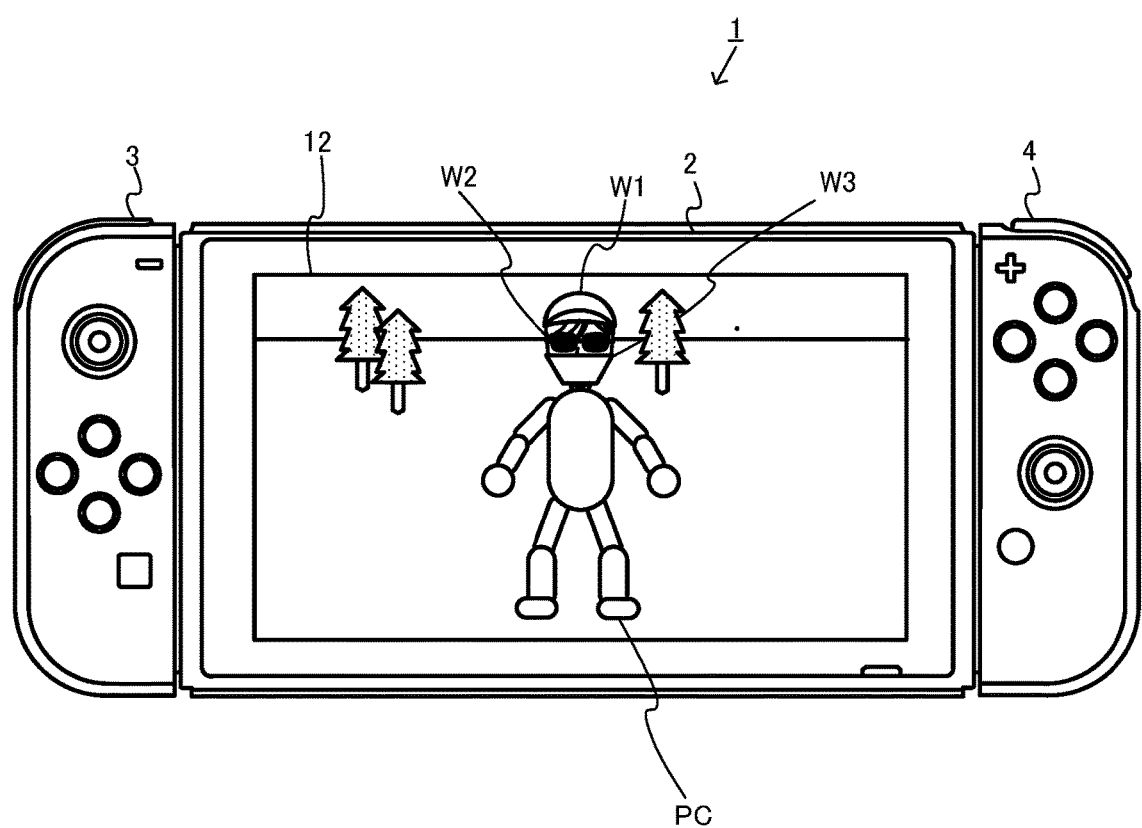
FIG. 3 is a diagram illustrating a non-limiting example of a game image indicating a player character PC in its initial state that appears in a virtual space displayed on a display 12 of the main body apparatus 2.
Figure 4:
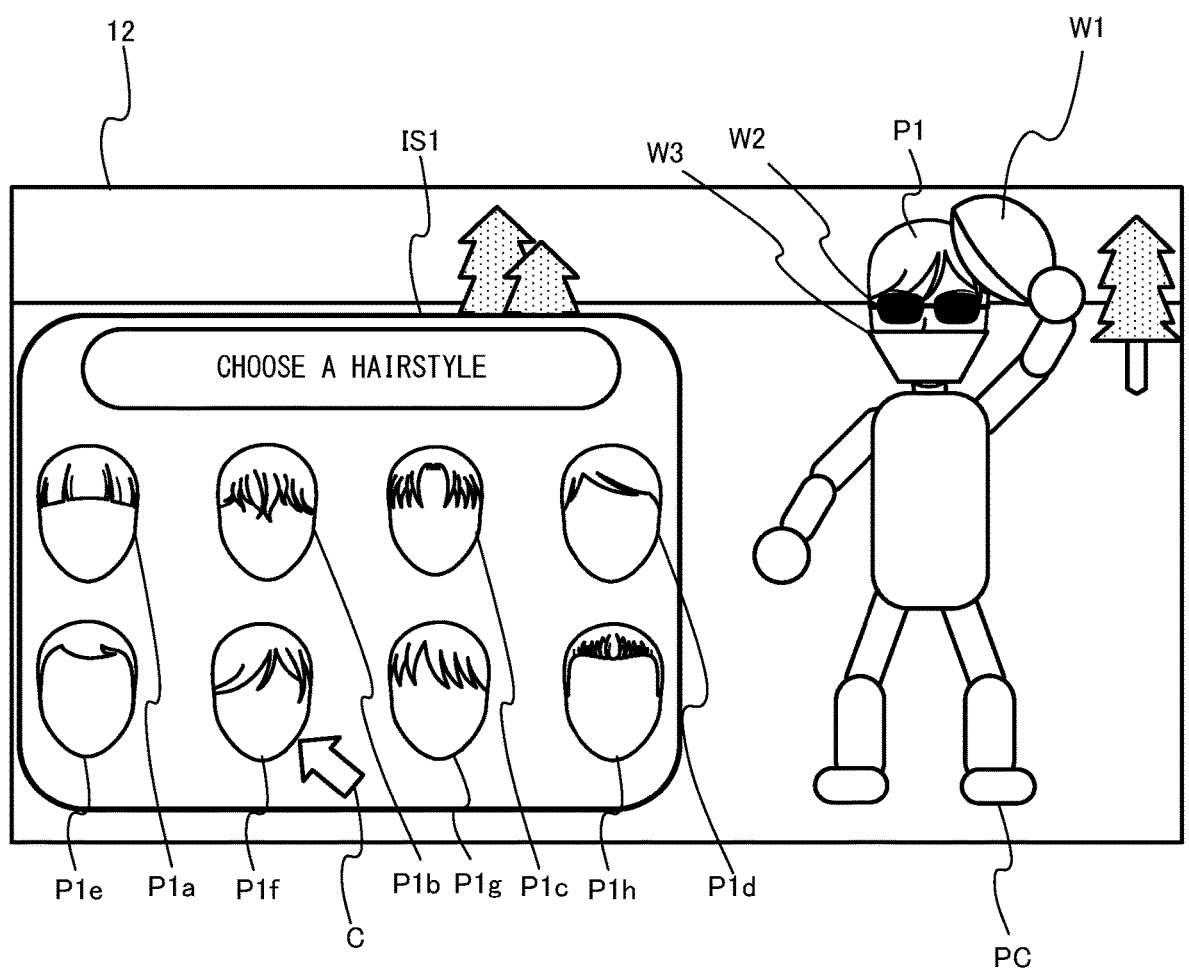
FIG. 4 is a diagram illustrating a first non-limiting example of a game image in which a user customizes the player character PC.
Figure 5:
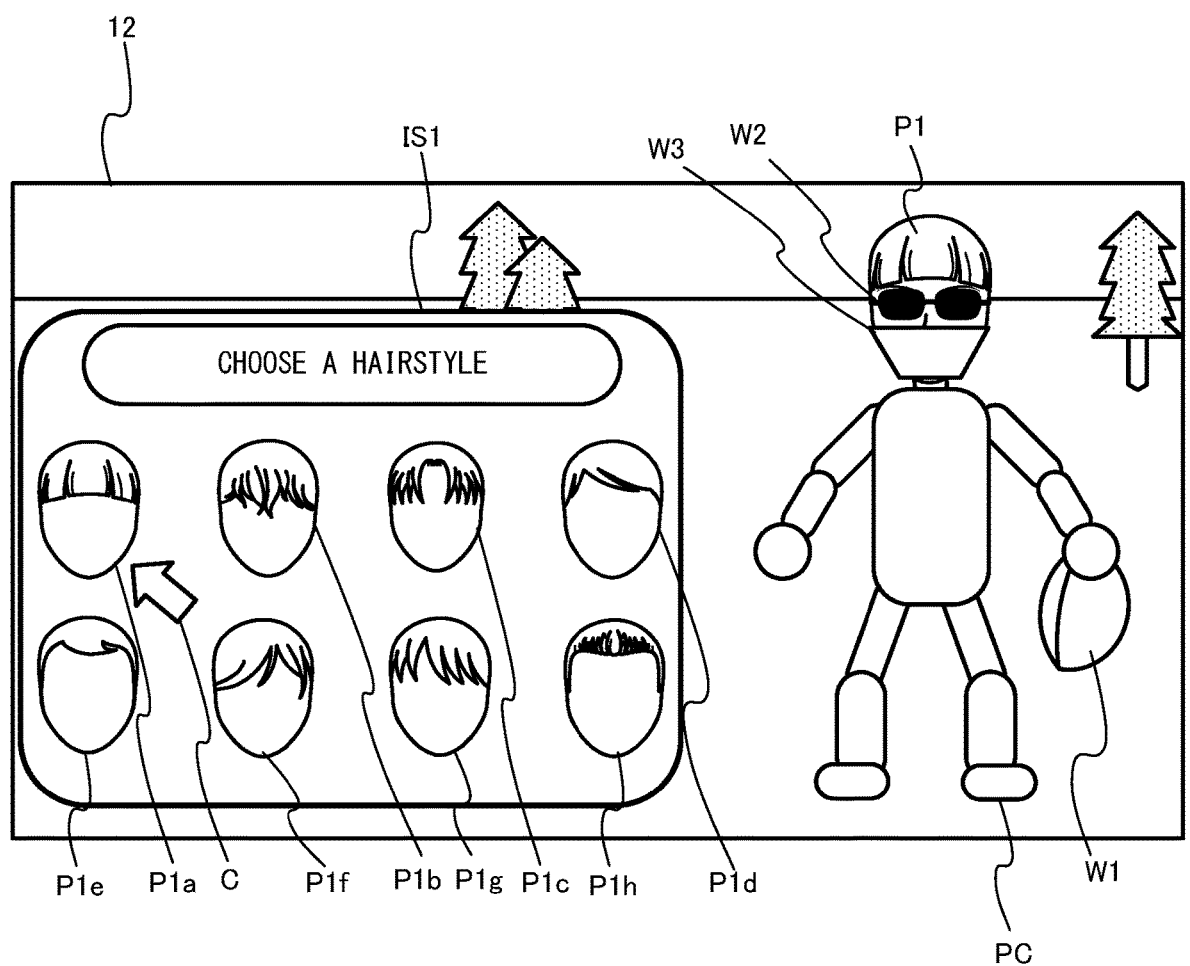
FIG. 5 is a diagram illustrating a second non-limiting example of a game image in which the user customizes the player character PC.
Figure 6:
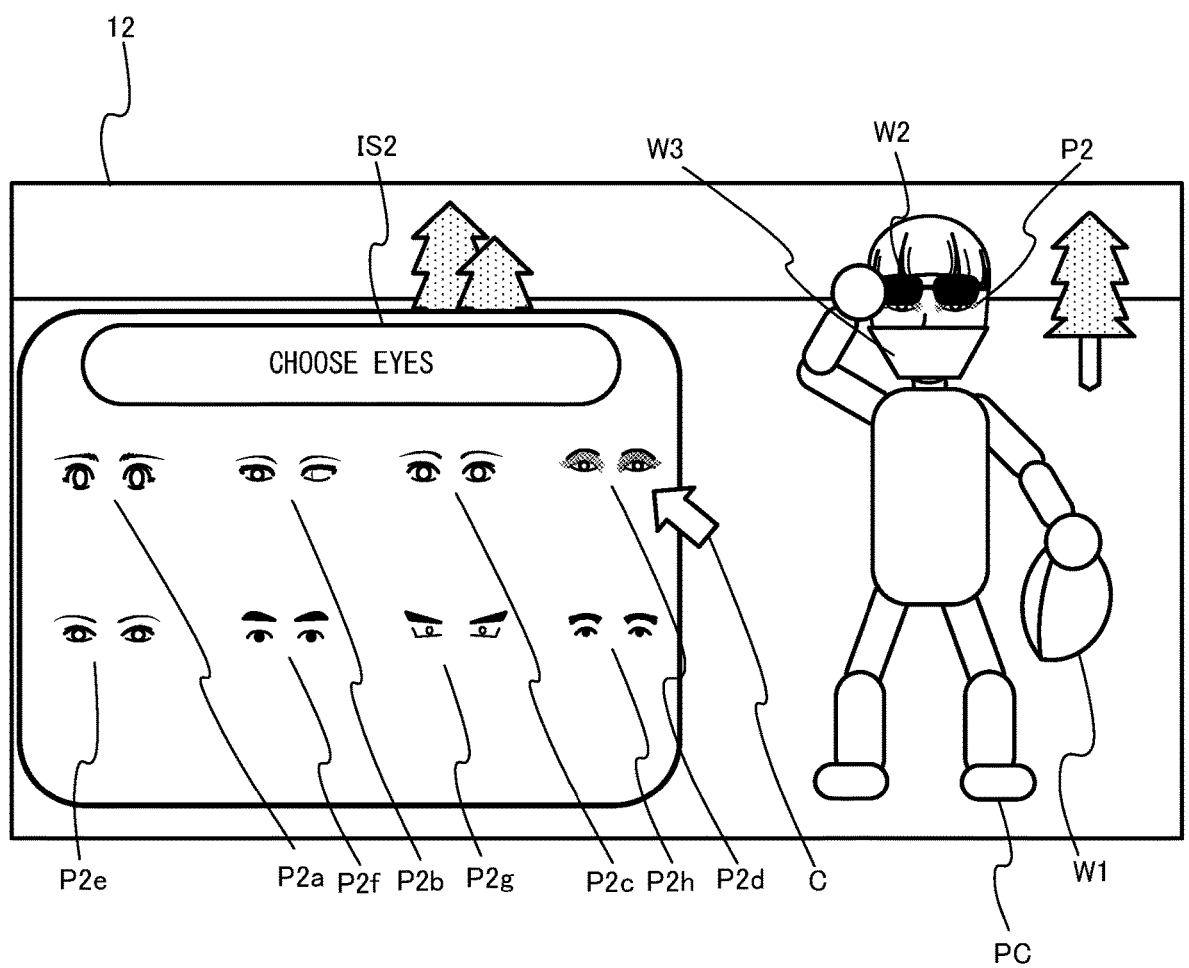
FIG. 6 is a diagram illustrating a third non-limiting example of a game image in which the user customizes the player character PC.
Figure 7:
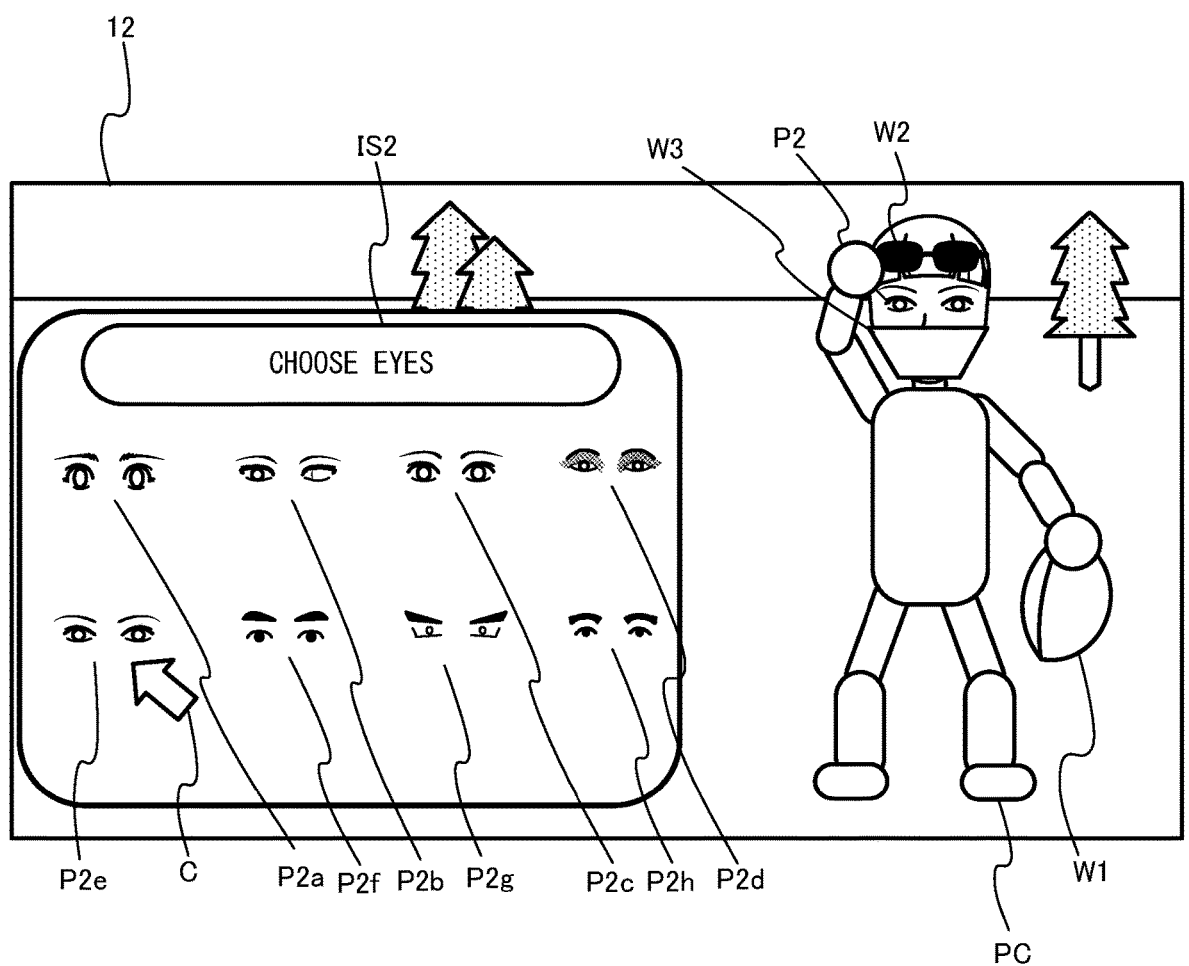
FIG. 7 is a diagram illustrating a fourth non-limiting example of a game image in which the user customizes the player character PC.

A game process that is executed in the game system 1 will be overviewed with reference to FIGS. 3 to 7. It should be noted that FIG. 3 is a diagram illustrating a non-limiting example of a game image indicating a player character PC in its initial state that appears in a virtual space displayed on the display 12 of the main body apparatus 2. FIG. 4 is a diagram illustrating a first non-limiting example of a game image in which the user customizes the player character PC. FIG. 5 is a diagram illustrating a second non-limiting example of a game image in which the user customizes the player character PC. FIG. 6 is a diagram illustrating a third non-limiting example of a game image in which the user customizes the player character PC. FIG. 7 is a diagram illustrating a fourth non-limiting example of a game image in which the user customizes the player character PC.

In FIG. 3, a game image in which the player character PC is disposed in a virtual space is displayed on the display 12 of the game system 1. The player character PC of FIG. 3 is in action in its initial state before the appearance thereof is customized by the user's operation. It should be noted that the initial state may be any state of the player character PC that is taken until the player character PC has been customized by the user's operation, including a state at a game starting time point that the game in which the player character PC appears has not yet progressed, and a state at a time point that the game has progressed to some extent.

In the initial state, the player character PC is displayed and appears in the virtual space, wearing or holding a plurality of accessories W. Here, the accessories W are worn or held, at least partially covering each of a plurality of parts included in the player character PC. A part that is at least partially covered by an accessory W is hereinafter referred to as a "non-exposed part." For example, in the non-limiting example game image of FIG. 3, the player character PC wears an accessory (e.g., a hat, hood, etc.) W1 that at least partially covers a hairstyle part, an accessory (e.g., sunglasses, glasses, etc.) W2 that at least partially covers a both-eye part, and an accessory (e.g., a mask, face veil, etc.) W3 that at least partially covers a mouth and nose part. It should be noted that the mouth and nose part that is covered by the accessory W3 may be either a single part including a set of a mouth and a nose, or separate parts that are a mouth part and a nose part.

As illustrated in FIGS. 4 to 7, in this non-limiting example game, the user is allowed to customize the player character PC for each part included in the player character PC. In the non-limiting examples of FIGS. 4 and 5, a game image is illustrated which is displayed in customizing a hairstyle part P1 of the player character PC. For example, in customizing the hairstyle part P1 of the player character PC, a candidate choice image IS1 is displayed for allowing the user to choose one from a plurality of options that can be used as the hairstyle part P1 of the player character PC. Specifically, in the non-limiting examples of FIGS. 4 and 5, eight hairstyle part candidates P1a to P1h are displayed as a plurality of options that can be used as the hairstyle part P1.

The user is allowed to move a cursor C for choosing one from the hairstyle part candidates P1a to P1h by operating an input apparatus (e.g., the stick 32) provided in the game system 1. When a hairstyle part candidate is chosen by the user's operation, the chosen hairstyle part candidate will be set as the hairstyle part of the player character PC and displayed in the virtual space. For example, in the non-limiting example of FIG. 5, the hairstyle part candidate P1a has been chosen by the cursor C being moved by the user's operation, and set and displayed as the hairstyle part P1.

Here, as can be seen from the motion state of the player character PC illustrated in FIGS. 4 and 5, in the situation that the user is allowed to customize the hairstyle part P1 of the player character PC, which is one of the plurality of parts, a scene is played back in which the player character PC removes the accessory W1 from the hairstyle part P1. For example, FIG. 4 illustrates a halfway state of the scene that the player character PC moves the accessory W1 such that the hairstyle part P1 is exposed externally, i.e., the accessory W1 has been moved, so that the hairstyle part P1 is partially exposed externally.

Here, in FIG. 4, the player character PC is in its initial state before the appearance thereof is customized by the user's operation, and a hairstyle part candidate P1f is set as the initial state of the hairstyle part P1. The cursor C is disposed at an initial position, indicating the hairstyle part candidate P1f, which is set for the player character PC in the initial state. It should be noted that in the initial state, the cursor C may be displayed at a position different from the above-mentioned initial position, or the cursor C may not be displayed, until the user's operation of moving the cursor C is performed. In addition, the cursor C can be moved even halfway through the scene that the accessory W1 is moved such that the hairstyle part P1 is exposed externally as illustrated in FIG. 4, and a hairstyle part candidate chosen according to the movement of the cursor C is set as the hairstyle part P1 of the player character PC and displayed in the virtual space.

FIG. 5 illustrates a final state of the scene that the player character PC moves the accessory W1 such that the hairstyle part P1 is exposed externally, i.e., the accessory W1 has been moved, so that the hairstyle part P1 is completely exposed externally. The scene is played back, showing that the hairstyle part P1, which was covered by the accessory W1, is exposed externally to a greater extent. Therefore, the player character PC performs an act of changing the state that the accessory W1 covers the hairstyle part P1, which allows the user to easily understand that the part that is being currently customized is the hairstyle part P1. In addition, the hairstyle part candidate chosen by the user is displayed, being set on the player character PC, which allows the user to choose a hairstyle part candidate while checking a balance or actual state in the player character PC. It should be noted that even halfway through the scene that the accessory W1 is moved such that the hairstyle part P1 is exposed externally as illustrated in FIG. 4, the hairstyle part P1 can be changed to a hairstyle part candidate chosen by the user's operation, and the chosen hairstyle part candidate can be set on the player character PC, and the resultant player character PC can be displayed. Therefore, the state that the player character PC is in action with the chosen hairstyle part candidate set on the player character PC can be checked. Furthermore, as illustrated in FIGS. 4 and 5, the other parts that the user has not yet customized remain hidden by the accessories W2 and W3, which allows the user to concentrate on the hairstyle part P1, which should currently be customized, expecting that the hidden parts will subsequently be customized Therefore, the user can consider how to change the hairstyle part P1, which needs to be currently customized, taking subsequent customizing into account.

In the scene that the player character PC removes the accessory W1 as illustrated in FIGS. 4 and 5, the motion of the player character PC is previously set irrespective of the user's operation. It should be noted that in that scene, a virtual camera and/or the player character PC may be moved and/or the orientations of the virtual camera and/or the player character PC may be changed, irrespective of the user's operation, such that the hairstyle part P1 is in the angle of view of the virtual camera, being exposed externally. In addition, the position and orientation of the virtual camera may not be able to be changed by the user's operation during a period of time that the player character PC is customized, including a period of time that the scene that the player character PC removes the accessory W1 is played back, and a period of time that one is chosen from the hairstyle part candidates P1a to P1h, and the hairstyle part P1 is changed to the chosen hairstyle part candidate. As a result, the user changes the hairstyle part P1 while viewing a sequence of video, whereby the user can have an immersive feeling. It should be noted that the playback of the scene that the player character PC removes the accessory W1 may be achieved by causing the player character PC to act in a predetermined manner as described above, or by playing back a predetermined moving image. The candidate choice image IS1 for choice may be displayed after a predetermined scene that the accessory W1 is removed has been played back.

When the user's operation of confirming the change of the hairstyle part P1 to end the process of changing the hairstyle part P1 is performed, the state transitions to the next state in which a process of playing back a scene that the accessory W covering the next part is moved is performed, and a process of changing that part is performed. For example, in the non-limiting examples illustrated in FIGS. 6 and 7, a game image is illustrated which is displayed in customizing the both-eye part P2 of the player character PC, after the scene playback process and the changing process have been performed on the hairstyle part P1, so that the hairstyle part P1 has been customized.

FIG. 6 illustrates a halfway state of a scene that the player character PC moves the accessory W2 such that the both-eye part P2 is exposed externally, i.e., the accessory W2 has been shifted to the forehead of the player character PC, so that the both-eye part P2 is partially exposed externally. FIG. 7 illustrates a final state of the scene that the player character PC moves the accessory W2 such that the both-eye part P2 is exposed externally, i.e., the accessory W2 has been further shifted to the head of the player character PC, so that the both-eye part P2 is completely exposed externally. In this scene, the both-eye part P2, which was covered by the accessory W2, is also displayed, being exposed externally to a greater extent. Therefore, the player character PC performs an act of changing the state that the accessory W2 covers the both-eye part P2, following the act of removing the accessory W1, which allows the user to easily understand that the part that is to be next customized is the both-eye part P2. In addition, at this time, a candidate choice image IS2 is displayed for allowing the user to choose one from a plurality of options that can be used as the both-eye part P2 of the player character PC. Specifically, in the non-limiting examples of FIGS. 6 and 7, eight both-eye part candidates P2a to P2h are displayed as the plurality of options that can be used as the both-eye part P2. As in the case of the hairstyle part candidates, the user is allowed to move the cursor C in order to choose one from the both-eye part candidates P2a to P2h by operating an input apparatus provided in the game system 1. The both-eye part candidate chosen by the user's operation is set as the both-eye part of the player character PC and displayed in the virtual space.

For example, in the non-limiting example of FIG. 6, for the player character PC, the both-eye part candidate P2d is set as the initial state of the both-eye part P2. The cursor C is disposed at an initial position, indicating the both-eye part candidate P2d, which is set for the both-eye part P2 in the initial state. It should be noted that even halfway through the scene that the accessory W2 is moved such that the both-eye part P2 is exposed externally as illustrated in FIG. 6, the cursor C can be moved, and a both-eye part candidate chosen according to the movement of the cursor C is set as the both-eye part P2 of the player character PC and displayed in the virtual space. In the non-limiting example of FIG. 7, the both-eye part candidate P2e has been chosen by the user's operation, and set and displayed as the both-eye part P2.

Here, as can be seen from the motion state of the player character PC illustrated in FIGS. 6 and 7, in the situation that the user is allowed to change the both-eye part P2 of the player character PC after customizing the hairstyle part P1, which are one of the plurality of parts, the player character PC performs an act of moving the accessory W2 covering the both-eye part P2 with the hairstyle part P1 remaining exposed externally (including the state that the hairstyle part P1 is partially exposed). The player character PC is displayed with the both-eye part candidate chosen by the user set on the both-eye part P2, which allows the user to choose a both-eye part candidate while checking a balance or actual state with respect to the hairstyle part P1, which has already been customized. It should be noted that as illustrated in FIGS. 6 and 7, the other part that the user has not yet customized remains hidden by the accessory W3. When the changing of the both-eye part P2 ends, the state transitions to the next state in which the user is similarly allowed to customize the part covered by the accessory W3.

It should be noted that the scene that the player character PC shifts the accessory W2 as illustrated in FIGS. 6 and 7 is also played back irrespective of the user's operation. At this time, the virtual camera and/or the player character PC may be moved and/or the orientations of the virtual camera and/or the player character PC may be changed, irrespective of the user's operation, such that not only the both-eye part P2, which is exposed externally by the playback of the scene, but also the part that has already been changed (the hairstyle part P1 in the non-limiting examples of FIGS. 6 and 7), are in the angle of view of the virtual camera. It should be noted that the virtual camera and/or the player character PC may be moved and/or the orientations of the virtual camera and/or the player character PC may be changed, irrespective of the user's operation, such that although the hairstyle part P1 is temporarily out of the angle of view of the virtual camera in a halfway state of the scene that the accessory W2 is moved such that the both-eye part P2 is exposed, the hairstyle part P1 is in the angle of view in a final state of the scene.

In the foregoing description, after the user's operation of confirming the change of the first part and ending the process of changing the first part has been performed, the first part remains exposed externally in the process of changing the second part. It should be noted that such display control may be performed only for the first and second parts, or may be continued until all parts included in the player character PC have been changed. Specifically, in the case where the player character PC includes first to fourth parts, the display control may be performed for any two parts for which the customizing process is successively performed, or the display control may be performed such that all parts for which the change has been confirmed and the changing process has been ended are exposed in the process of changing the second to fourth parts.

Alternatively, after a part covered by an accessory W has been exposed externally and displayed, and the user has changed the part, the resultant part may be covered by the accessory W before the state transitions to the next state in which the next part is to be changed. In that case, the next part to be changed can be clearly indicated.

Such a customizing process is performed for all parts of the player character PC that can be customized, serially on a part-by-part basis. When all of the parts have been customized, the customizing of the player character PC by the user ends. A game progresses in which the customized player character PC is used. It should be noted that after the player character PC has been customized as described above, in a game that subsequently progresses no parts may be covered by the respective accessories W, or at least one accessory W may cover the corresponding part again as in the initial state.

Although in the above non-limiting example, one of the parts included in the player character PC is changed and customized by the user choosing one from a plurality of part candidates, the part candidates that are presented to the user may be part candidate groups including various different types. For example, the player character PC may be customized using parts chosen from various part candidate groups such as a part candidate group including different shapes, a part candidate group including different sizes, and a part candidate group including different colors and lightnesses. The parts may be changed and customized by a method different from the method of choosing one from a plurality of part candidates. For example, one of the parts included in the player character PC may be changed and customized by changing the shape, size, color, lightness, or the like of the part according to the user's operation, or may be freely created and rendered according to the user's operation.

In addition to or instead of the combination of a hat or hood and a hairstyle part, the combination of sunglasses or glasses and a both-eye part, and the combination of a mask or face veil and a mouth and nose part, other parts and other accessories W for covering the parts may be combined. Specifically, a mask or face veil may be combined with a facial outline part; a mantle, with a body shape part or a clothing part; a garment, with an undershirt or underwear part; a garment, with a leg part or a trunk part; headphones, with an ear part; and the like. In addition to these things that are worn by the player character PC, the accessories W may include items that are held by the player character PC. Examples of such items include umbrellas and handheld fans. The combination of a part and a held item for covering the part may, for example, be the combination of an umbrella or handheld fan and a face part that is partially hidden by the umbrella or handheld fan.

As illustrated in FIG. 3, when the player character PC is in its initial state, the hairstyle part P1 is covered by the accessory W1 with a portion (a portion of the forelock) of the hairstyle part P1 exposed externally. Thus, an accessory that covers a part included in the player character PC may allow that part to be partially exposed externally when the player character PC is in its initial state. An accessory that covers a part included in the player character PC may have a translucent portion. In that case, when the player character PC is in its initial state, a portion of that part may be seen from the outside through the translucent portion of that accessory.

Examples of the scene that an accessory is moved such that a part which was covered by the accessory is exposed externally, include a scene that an accessory is displaced such that a part is exposed externally, a scene that an accessory is stripped off such that a part is exposed externally, a scene that an accessory is taken off such that a part is exposed externally, and a scene that an accessory is opened such that a part is exposed externally.

As used herein, the term "expose" with respect to a "non-exposed part," a portion of which is covered by an accessory, may mean that the non-exposed part is exposed to a greater extent than when the player character PC is in its initial state, i.e., a non-exposed part may not completely be exposed externally. It should be noted that when an accessory is moved to change the state that the accessory covers a non-exposed part, the accessory may come to cover at least a portion of another part different from that non-exposed part. As a non-limiting example, as illustrated in FIG. 7, although, after the accessory W2 has been moved, the accessory W2 partially covers the hairstyle part P1, the hairstyle part P1 is exposed externally to a greater extent than when the player character PC is in its initial state. Such a state of the hairstyle part P1 is also a "state that a non-exposed part is exposed."

Figure 8:
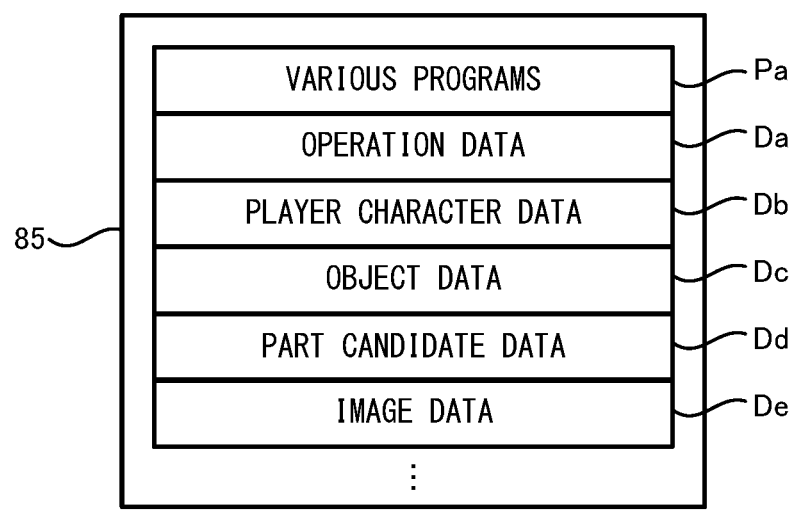
FIG. 8 is a diagram illustrating a non-limiting example of a data area set in a DRAM 85 of the main body apparatus 2 in the present non-limiting example.

Next, a non-limiting example of a specific process that is executed in the game system 1 in the present non-limiting example will be described with reference to FIGS. 8 to 10. FIG. 8 is a diagram illustrating a non-limiting example of a data area set in the DRAM 85 of the main body apparatus 2 in the present non-limiting example. It should be noted that in addition to the data illustrated in FIG. 8, the DRAM 85 also stores data that is used in other processes, and which will not be described in detail.

The DRAM 85 stores, in a program storage area, various programs Pa that are executed in the game system 1. In the present non-limiting example, the programs Pa include an application program (e.g., a game program) that performs information processing based on data obtained from the left controller 3 and/or the right controller 4 and the main body apparatus 2. It should be noted that the programs Pa may be previously stored in the flash memory 84; may be obtained from a storage medium removably attached to the game system 1 (e.g., a predetermined type of storage medium attached to the slot 23) and then stored in the DRAM 85; or may be obtained from another apparatus via a network, such as the Internet, and then stored in the DRAM 85. The processor 81 executes the programs Pa stored in the DRAM 85.

The DRAM 85 also stores, in a data storage area, various kinds of data that are used in processes such as an information process that are executed in the game system 1. In the present non-limiting example, the DRAM 85 stores operation data Da, player character data Db, object data Dc, part candidate data Dd, and image data De, and the like.

The operation data Da is obtained, as appropriate, from each of the left controller 3 and/or the right controller 4 and the main body apparatus 2. As described above, operation data obtained from each of the left controller 3 and/or the right controller 4 and the main body apparatus 2 includes information about an input from each input section (specifically, each button, an analog stick, or a touch panel) (specifically, information about an operation). In the present non-limiting example, operation data is obtained from each of the left controller 3 and/or the right controller 4 and the main body apparatus 2, and the obtained operation data is used to update the operation data Da as appropriate. It should be noted that the operation data Da may be updated for each frame that is the cycle of a process that is executed in the game system 1 as described below, or may be updated each time the operation data is obtained.

The player character data Db indicates the position, orientation, and motion of the player character PC when the player character PC is disposed in the virtual space, and states of parts included in the player character PC, and the like.

The object data Dc indicates the type, position, orientation, and state, and the like of each of virtual objects such as accessories worn or held by the player character PC and objects disposed in the virtual space.

The part candidate data Dd indicates part candidates that are options for customizing the player character PC.

The image data De is for displaying, on a display screen (e.g., the display 12 of the main body apparatus 2), images (e.g., an image of the player character PC including the accessories W, an image of the candidate choice image IS including part candidates, an image of other objects, an image of the virtual space, a background image, etc.).

Next, a specific non-limiting example of an information process in the present non-limiting example will be described with reference to FIGS. 9 and 10. FIG. 9 is a flowchart illustrating a non-limiting example of an information process that is executed in the game system 1. FIG. 10 is a subroutine illustrating a specific non-limiting example of a customizing process that is performed in step S124 illustrated in FIG. 9. In the present non-limiting example, a series of processes illustrated in FIGS. 9 and 10 are performed by the processor 81 executing a predetermined application program (game program) included in the programs Pa. The information process of FIGS. 9 and 10 is started with any suitable timing.

Figure 9:
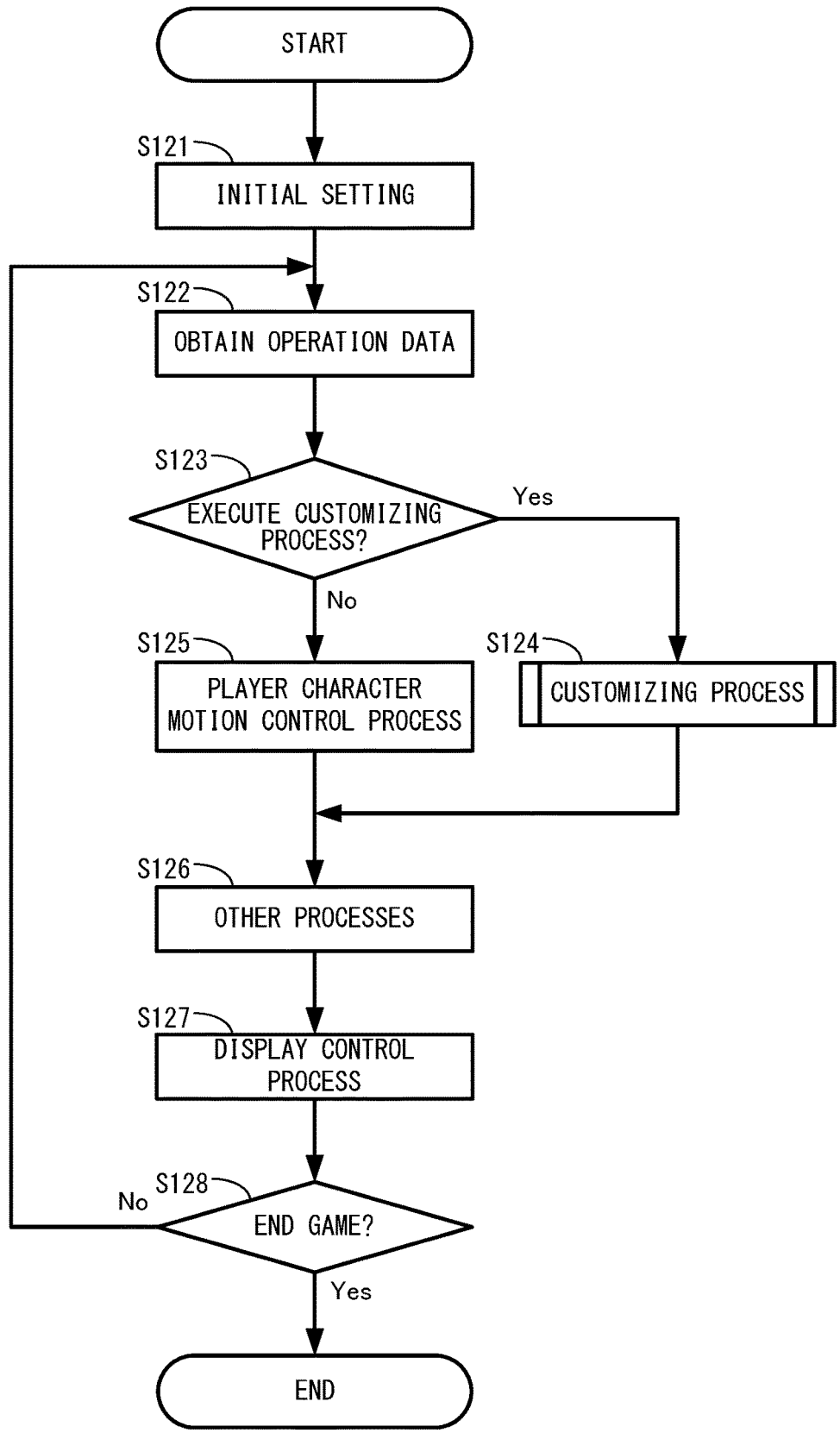
FIG. 9 is a flowchart illustrating a non-limiting example of an information process that is executed in a game system 1.
Figure 10:
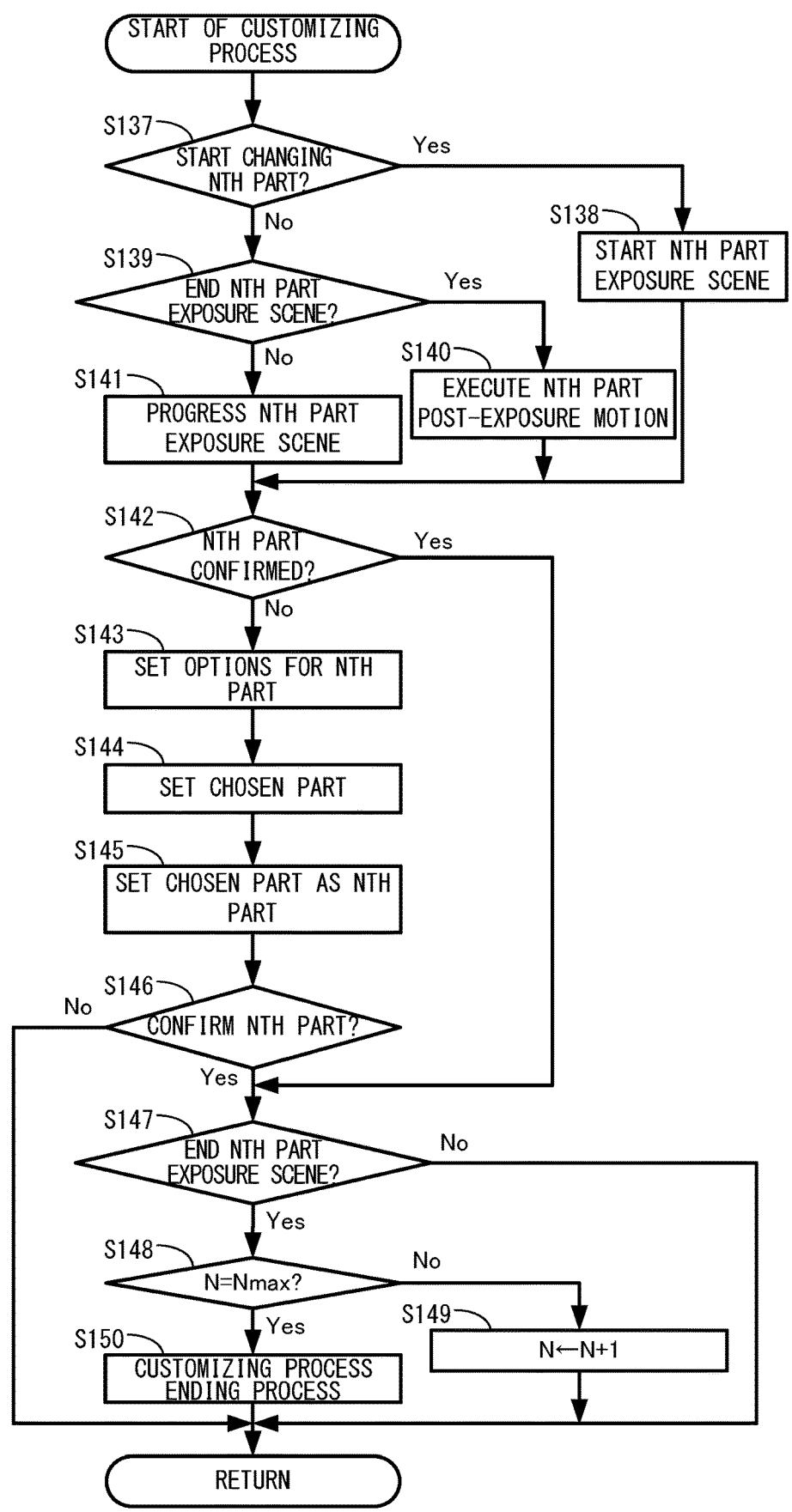
FIG. 10 is a subroutine illustrating a specific non-limiting example of a customizing process that is performed in step S124 illustrated in FIG. 9.

It should be noted that the steps in the flowchart of FIGS. 9 and 10, which are merely illustrative, may be executed in a different order, or another step may be executed in addition to (or instead of) each step, if a similar effect is obtained. In the present non-limiting example, it is assumed that the processor 81 executes each step of the flowchart. Alternatively, a portion of the steps of the flowchart may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 9 and 10 may be executed by a plurality of information processing apparatuses including the main body apparatus 2 cooperating with each other.

In FIG. 9, the processor 81 performs initial setting for the information process (step S121), and proceeds to the next step. For example, in the initial setting, the processor 81 initializes parameters for performing processes described below. For example, the processor 81 sets the initial state of the player character PC, and disposes the player character PC in the virtual space (see FIG. 8), and initially sets the player character data Db and the object data Dc. The processor 81 also initially sets a temporary variable N that is used in the flowchart to one. The processor 81 also sets the maximum value Nmax of the temporary variable N to the number of parts that can be customized, of the parts included in the player character PC.

Next, the processor 81 obtains operation data from each of the left controller 3, the right controller 4, and/or the main body apparatus 2, and updates the operation data Da (step S122), and proceeds to the next step.

Next, the processor 81 determines whether or not the current time point is in the period of time that the customizing process is performed (step S123). For example, if at the current time point, it is time to start the customizing process, or if the customizing process is being performed at the current time point, the result of the determination by the processor 81 in step S123 is positive. If the current time point is in the period of time that the customizing process is performed, the processor 81 proceeds to step S124. Otherwise, i.e., if the current time point is not in the period of time that the customizing process is performed, the processor 81 proceeds to step S125.

In step S124, the processor 81 performs the customizing process, and proceeds to step S126. The customizing process that is performed in step S124 will be described below with reference to FIG. 10.

In FIG. 10, the processor 81 determines whether or not the current time point is the timing of starting of the customizing process for changing the Nth part (step S137). If the current time point is the timing of starting of the customizing process for changing the Nth part, the processor 81 proceeds to step S138. Otherwise, i.e., if the current time point is not the timing of starting of the customizing process for changing the Nth part, the processor 81 proceeds to step S139.

In step S138, the processor 81 starts a scene that the player character PC externally exposes the Nth part, and proceeds to step S142. For example, the processor 81 starts playing back a scene that the player character PC moves an accessory W covering the Nth part, which is one of the parts included in the player character PC, such that the Nth part is exposed externally to a greater extent, and updates the player character data Db and the object data Dc of that accessory W according to the progress of the scene.

In step S139, the processor 81 determines whether or not the current time point is the timing of ending of the scene that the player character PC externally exposes the Nth part. For example, if the current time point is the timing of ending of the scene that has started to be played back in step S138, in which the player character PC moves an accessory W, the result of the determination by the processor 81 in step S139 is positive. If the current time point is the timing of ending of the scene that the player character PC externally exposes the Nth part, the processor 81 proceeds to step S140. Otherwise, i.e., if the current time point is not the timing of ending of the scene that the player character PC externally exposes the Nth part, the processor 81 proceeds to step S141.

In step S140, the processor 81 ends the scene that the player character PC externally exposes the Nth part, causes the player character PC to perform a post-exposure motion, and proceeds to step S142. For example, the processor 81 ends playing back the scene that the player character PC moves an accessory W, causes the player character PC to perform a post-exposure motion after the end of the scene, and updates the player character data Db and the object data Dc of that accessory W and the like. For example, the post-exposure motion is the player character PC's act of repeatedly performing a predetermined motion such as breathing. It should be noted that instead of the post-exposure motion, the player character PC may continue to be still in the virtual space.

In step S141, the processor 81 causes the scene that the player character PC externally exposes the Nth part to progress, and proceeds to step S142. For example, the processor 81 causes playback of the scene that the player character PC moves an accessory W to progress by a predetermined period of time (e.g., one frame), and updates the player character data Db and the object data Dc of the accessory W and the like according to the progress of the scene. It should be noted that the playback process is to play back a scene that an accessory corresponding to one of the plurality of non-exposed parts is moved such that the one of the plurality of non-exposed parts is exposed, and corresponds to steps S138 to S141, for example.

In step S142, the processor 81 determines whether or not the Nth part has been confirmed and the changing process has been ended for the Nth part. For example, if it is determined in step S146 described below that the user's operation of confirming the Nth part and ending the changing process for the Nth part has been performed, the result of the determination in step S142 is positive. If the Nth part has not yet been confirmed, the processor 81 proceeds to step S143. Otherwise, i.e., if the Nth part has been confirmed and the changing process has been ended for the Nth part, the processor 81 proceeds to step S147.

In step S143, the processor 81 sets the candidate choice image IS in which part candidates for the Nth part are displayed as options for customizing the Nth part, and proceeds to the next step. For example, if the Nth part is to be changed, the processor 81 updates the part candidate data Dd with part candidates prepared for the Nth part. The processor 81 sets the candidate choice image IS in which the part candidates set in the part candidate data Dd are disposed. At this time, options for customizing the Nth part (the candidate choice image IS) may not be set, until the end of the scene that the accessory W covering the Nth part is moved such that the Nth part is exposed externally.

Next, the processor 81 sets a part candidate chosen at the current time point as a chosen part (step S144), and proceeds to the next step. For example, the processor 81 moves the cursor C according to the operation data Da, and sets a part candidate indicated by the cursor C as a chosen part. If the operation data Da indicates the user's operation of moving the cursor C, and by the user's operation, the cursor C has been moved to a position indicating a part candidate different from a chosen part currently set, the processor 81 sets the part candidate indicated by the cursor C after the movement as a newly chosen part. It should be noted that in the initial state, for the Nth part, one of the part candidates has been initially set as a chosen part, and the cursor C indicates the chosen part. It should be noted that in the initial state, the cursor C may not indicate any part candidate, and at that time, no chosen part may not have been set.

Next, the processor 81 sets the chosen part as the Nth part of the player character PC when the player character PC is being customized (step S145), and proceeds to the next step. For example, the processor 81 sets the chosen part set in step S144 as the Nth part of the player character PC, and updates the player character data Db.

Next, the processor 81 determines whether or not the user's operation of confirming the chosen part currently set as the Nth part has been performed (step S146). For example, if the operation data Da indicates the user's operation of confirming the chosen part currently set as the Nth part, the result of the determination in step S146 by the processor 81 is positive. If the user's operation of confirming the chosen part currently set as the Nth part has been performed, the processor 81 proceeds to step S147. Otherwise, i.e., if the user's operation of confirming the chosen part currently set as the Nth part has not been performed, the processor 81 ends the subroutine. It should be noted that the changing process is to allow the user to change a part that is exposed by the playback process, and corresponds to steps S143 to S146, for example.

In step S147, the processor 81 determines whether or not the scene that the accessory W covering the Nth part of the player character PC is moved such that the Nth part is exposed externally has ended. If the scene that the accessory W covering the Nth part of the player character PC is moved such that the Nth part is exposed externally has ended, the processor 81 proceeds to step S148. Otherwise, i.e., if the scene that the accessory W covering the Nth part of the player character PC is moved such that the Nth part is exposed externally has not ended, the processor 81 ends the subroutine.

In step S148, the processor 81 determines whether or not the temporary variable N is the maximum value Nmax. If the temporary variable N is less than the maximum value Nmax, the processor 81 proceeds to step S149. Otherwise, i.e., if the temporary variable N is the maximum value Nmax, the processor 81 proceeds to step S150.

In step S149, the processor 81 increments the temporary variable N (adds one thereto), and ends the subroutine.

In step S150, the processor 81 performs a process of ending the customizing process, and proceeds to the next step. For example, the processor 81 ends a series of steps of customizing the player character PC, and transitions to a process of progressing the game using the customized player character PC.

In the non-limiting example described above with reference to the flowchart, when the user's operation of confirming a chosen part as the Nth part has been performed, the result of the determination in step S142 or step S146 is positive, and steps S148 to S150 are not performed, until the end of the scene that the accessory W covering the Nth part is moved such that the Nth part is exposed externally (until the result of the determination in step S147 is positive). Therefore, in the above non-limiting example, even when the user's operation of confirming a chosen part as the Nth part has been performed, the processor 81 does not proceed to the step of customizing the next part (i.e., the (N+1)th part) or the step of ending customizing the entire player character PC, until the end of the scene that the accessory W covering the Nth part is moved such that the Nth part is exposed externally. It should be noted that in another non-limiting example, when the user's operation of confirming a chosen part as the Nth part has been performed, the processor 81 may proceed to the step of customizing the next part (i.e., the (N+1)th part) or the step of ending customizing the entire player character PC, without waiting for the end of the scene that the accessory W covering the Nth part is moved such that the Nth part is exposed externally.

Referring back to FIG. 9, if it is determined in step S123 that the current time point is not in the period of time that the customizing process is performed, the processor 81 controls the motion of the player character PC according to the operation data Da (step S125), and proceeds to step S126. For example, the processor 81 causes the player character PC to act in the virtual space according to the operation data Da obtained in step S122, and updates the player character data Db.

In step S126, the processor 81 performs another process, and proceeds to the next step. For example, the processor 81 controls the motions of virtual objects (e.g., other characters, opponent characters, other objects in the virtual space, etc.) other than the player character PC.

Next, the processor 81 performs a display control process (step S127), and proceeds to the next step. For example, the processor 81 disposes the player character PC and other virtual objects and the like in the virtual space based on the player character data Db and the object data Dc. The processor 81 also causes the player character PC to wear or hold accessories W, as appropriate, based on the object data Dc. The processor 81 also sets the position and/or orientation of a virtual camera for generating a display image, and disposes the virtual camera in the virtual space. It should be noted that in the customizing process, the processor 81 sets the position and/or orientation of the virtual camera such that at least the Nth part of the player character PC is in the angle of view of the virtual camera. Thereafter, the processor 81 generates an image of the virtual space as viewed from the virtual camera thus set. The processor 81 also optionally generates the candidate choice image IS in which part candidates are displayed, based on the part candidate data Dd, and disposes the candidate choice image IS at an appropriate position in the image of the virtual space. Thereafter, the processor 81 performs control to display the generated image of the virtual space on the display 12.

Next, the processor 81 determines whether or not to end the game process (step S128). The condition for ending the game process in step S128 is, for example, that the condition for ending the game process is satisfied, that the user performs an operation of ending the game process, etc. If the processor 81 does not determine to end the game process, the processor 81 returns to step S122, and repeats the process. If the processor 81 determines to end the game process, the processor 81 ends the process of the flowchart. Thereafter, steps S122-S128 are repeatedly executed until the processor 81 determines, in step S128, to end the game process.

Thus, in the present non-limiting example, in customizing a character, a scene that an accessory is moved such that a part to be customized is exposed externally is displayed, and therefore, the user can easily understand which part is to be next customized.

It should be noted that in the above non-limiting example, options for customizing the Nth part (the candidate choice image IS) are displayed at the same time when the scene that the accessory W covering the Nth part is moved such that the Nth part is exposed externally starts to be played back. Alternatively, options for customizing the Nth part may be displayed after a predetermined period of time has passed since the start of playback of the scene that the accessory W covering the Nth part is moved such that the Nth part is exposed externally, or after the end of playback of the scene that the accessory W covering the Nth part is moved such that the Nth part is exposed externally.

It should be noted that the parts included in the player character PC may include a part that can be customized by the user and that is not covered by an accessory in the initial state. In that case, in customizing such a part, the part may be customized without playback of the scene that the player character PC removes an accessory so that the part is exposed externally.

In addition, a part that has been customized may be able to be recustomized. As a first non-limiting example, a part that has already been customized may be able to be similarly customized again halfway through customizing of the player character PC from its initial state. Here, in the case where the scene that the player character PC moves an accessory covering a non-exposed part is played back, the positions and/or orientations of the virtual camera and/or the player character PC are set such that not only the non-exposed part to be exposed externally in playback of the scene, but also a part(s) that has already been changed, are in the angle of view of the virtual camera. Therefore, the part that has already been changed can be modified, taking into consideration a balance between that part and the non-exposed part to be currently customized. In addition, the pose or orientation of the player character PC which is taken when the player character PC is disposed in the virtual space so that the non-exposed part to be changed at the current time point is customized, may be different from that which was taken when a part that has already been changed was customized. In that case, a part that has already been changed can be recustomized while viewing the player character PC in a different composition.

In a second non-limiting example, after the player character PC was completely customized from its initial state, and then a game has progressed using the customized player character PC, the player character PC may be able to be customized again. In that case, in a customizing screen dedicated to the second customizing and following customizing, all parts that can be customized may be able to be changed, as appropriate, with the parts exposed externally. In the second customizing and following customizing, a customizing process similar to that which is performed from the initial state may be performed.

In the case where the mouth and nose part of the player character PC, which is covered by the accessory W3, is composed of separate parts, each of which can be separately customized, a plurality of parts that can be customized is covered by a single accessory W in the initial state of the player character PC. In such a case where a plurality of parts to be customized are covered by a single accessory in the initial state, the accessory may be moved such that only a part to be first customized is exposed externally, and that part may be changed, and after that part has been changed, the accessory may be further moved such that another part is also exposed externally, and that part may be changed.

It should be noted that the game system 1 may be any suitable apparatus, including a handheld game apparatus, or any suitable handheld electronic apparatus (a personal digital assistant (PDA), mobile telephone, personal computer, camera, tablet computer, etc.), etc. In that case, an input apparatus for performing an operation of causing the player object PC to act may be, instead of the left controller 3, the right controller 4, or the touch panel 13, another controller, mouse, touchpad, touch panel, trackball, keyboard, directional pad, slidepad, etc.

In the foregoing, all process steps in the above information process are performed in the game system 1. Alternatively, at least a portion of the process steps may be performed in another apparatus. For example, when the game system 1 can communicate with another apparatus (e.g., another server, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above non-limiting example, the information process can be performed by the processor 81 of the game system 1 executing a predetermined program. Alternatively, all or a portion of the above process may be performed by a dedicated circuit included in the game system 1.

Here, according to the above non-limiting variation, the present non-limiting example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the above steps may be performed by substantially any of the apparatuses, and the present non-limiting example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement the present non-limiting example.

The above program may be supplied to the game system 1 not only through an external storage medium, such as an external memory, but also through wired or wireless communications. The program may be previously stored in a non-volatile storage device in the game system 1. Examples of an information storage medium storing the program include non-volatile memories, and in addition, CD-ROMs, DVDs, optical disc-shaped storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims. It should be understood that those skilled in the art could carry out the literal and equivalent scope of the appended claims based on the description of the present non-limiting example and common technical knowledge. It should be understood throughout the present specification that expression of a singular form includes the concept of its plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which the present non-limiting example pertain. If there is any inconsistency or conflict, the present specification (including the definitions) shall prevail.

As described above, the present non-limiting example is applicable as an information processing program, information processing apparatus, information processing system, and information processing method, etc., with which, in customizing of a plurality of parts included in a character, the use can easily understand which of the parts is to be next changed.

What is claimed is:

1. A non-transitory computer-readable storage medium having stored therein an information processing program for causing a computer to execute a character customizing process of allowing a user to change a plurality of parts included in a character appearing in a virtual space, the information processing program, when executed, causing the computer to perform operations comprising:
   displaying the character in the virtual space in an initial state with at least two of the plurality of parts set as non-exposed parts that are at least partially covered by respective accessories; and
   executing a playback process of playing back a scene in which the accessory for one of the at least two non-exposed parts is moved such that the one of the at least two non-exposed parts is exposed, and a changing process of allowing the user to change the part exposed by the playback process, serially for the at least two non-exposed parts of the character in the initial state.

2. The non-transitory computer-readable storage medium according to claim 1, wherein the information processing program, when executed, further causes the computer to perform operations comprising:
   after having performed the playback process and the changing process on a first one of the at least two non-exposed parts, executing a customizing process of allowing the user to change a second one of the at least two non-exposed parts that is different from the first non-exposed part, with the first non-exposed part exposed.

3. The non-transitory computer-readable storage medium according to claim 2, wherein in executing the customizing process of allowing the user to change the second non-exposed part, the first non-exposed part is displayed together with the second non-exposed part in the character in a display screen with the first non-exposed part exposed, and a recustomizing process of allowing the user to change the displayed first non-exposed part again is enabled.

4. An information processing system for executing a character customizing process of allowing a user to change a plurality of parts included in a character appearing in a virtual space, comprising:
   a computer and a memory, the computer being configured to control the information processing system to at least:
      display the character in the virtual space in an initial state with at least two of the plurality of parts set as non-exposed parts that are at least partially covered by respective accessories; and
      execute a playback process of playing back a scene in which the accessory for one of the at least two non-exposed parts is moved such that the one of the at least two non-exposed parts is exposed, and a changing process of allowing the user to change the part exposed by the playback process, serially for the at least two non-exposed parts of the character in the initial state.

5. An information processing method for executing a character customizing process of allowing a user to change a plurality of parts included in a character appearing in a virtual space, comprising:
  displaying the character in the virtual space in an initial state with at least two of the plurality of parts set as non-exposed parts that are at least partially covered by respective accessories; and
  executing a playback process of playing back a scene in which the accessory for one of the at least two non-exposed parts is moved such that the one of the at least two non-exposed parts is exposed, and a changing process of allowing the user to change the part exposed by the playback process, serially for the at least two non-exposed parts of the character in the initial state.

6. The non-transitory computer-readable storage medium according to claim 1, wherein each of the accessories is worn or held.

7. The non-transitory computer-readable storage medium according to claim 1, wherein each of the accessories at least initially covers at least a portion the character's body.

8. The non-transitory computer-readable storage medium according to claim 1, wherein the accessories are hats, hoods, sunglasses, glasses, masks, or face veils.

9. A non-transitory computer-readable storage medium having stored therein an information processing program for causing a computer to customize a plurality of customizable parts of a character appearing in a virtual space, the information processing program, when executed, causing the computer to perform operations comprising:
  displaying the character in the virtual space in an initial state in which the customizable parts of the character are at least partially concealed; and
  for each of the customizable parts:
    revealing a limited portion of the respective customizable part;
    enabling a user to select a customization for the respective customizable part while only the limited portion of the respective customizable part is revealed;
    applying the selected customization to the respective customizable part while only the limited portion of the respective customizable part is revealed; and
    further revealing the respective customizable part following application of the selected customization.

10. The non-transitory computer-readable storage medium according to claim 9, wherein the information processing program, when executed, further causes the computer to perform operations comprising, for each of the customizable parts:
  enabling the user to select a different customization for the respective customizable part;
  in response to the user selecting the different customization, updating the respective customizable part with the different selected customization while only the limited portion of the respective customizable part is revealed; and
  enabling the user to set the customization for the respective customizable part,
  wherein the further revealing is performed in response to the user setting the customization for the respective customizable part.

11. The non-transitory computer-readable storage medium according to claim 9, wherein, for each of the customizable parts:
  a first animation is played during the revealing of the limited portion of the respective customizable part; and
  a second animation is played during the further revealing of the respective customizable part following the application of the selected customization, the first and second animations being different from one another.

12. The non-transitory computer-readable storage medium according to claim 11, wherein, for each of the customizable parts, the first animation includes movement of an object at least partially concealing the respective part.

13. The non-transitory computer-readable storage medium according to claim 11, wherein, for each of the customizable parts, the first animation includes a first movement of an object at least partially concealing the respective part, and the second animation includes a second movement of the object, the first and second movements being different from one another.

14. The non-transitory computer-readable storage medium according to claim 9, wherein the character is animated once a given customizable part is customized through an associated user selection.

15. The non-transitory computer-readable storage medium according to claim 9, wherein the customizable parts of the character are customizable by the user in a defined order.

16. The non-transitory computer-readable storage medium according to claim 9, wherein the user customizes the customizable parts of the character in the defined order such that earlier customized parts are reflected in later customizations.

17. The non-transitory computer-readable storage medium according to claim 9, wherein the customizable parts are at least initially concealed with removable objects.

18. The non-transitory computer-readable storage medium according to claim 17, wherein each of the removable objects is worn or held.

19. The non-transitory computer-readable storage medium according to claim 17, wherein at least some of the customizable parts are body parts of the character.

20. The non-transitory computer-readable storage medium according to claim 10, wherein, for each of the customizable parts:
  a first animation is played during the revealing of the limited portion of the respective customizable part; and
  a second animation is played during the further revealing of the respective customizable part following the application of the selected customization, the first and second animations being different from one another.

* * * * *